United States Patent
Previdi et al.

(10) Patent No.: US 8,179,801 B2
(45) Date of Patent: *May 15, 2012

(54) ROUTING-BASED PROXIMITY FOR COMMUNICATION NETWORKS

(75) Inventors: Stefano Previdi, Rome (IT); Jan Medved, Pleasanton, CA (US); Jining Tian, Cupertino, CA (US); Steven Luong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/480,941

(22) Filed: Jun. 9, 2009

(65) Prior Publication Data

US 2010/0309789 A1    Dec. 9, 2010

(51) Int. Cl.
*H04L 12/56* (2006.01)

(52) U.S. Cl. ......................... 370/238; 370/255

(58) Field of Classification Search .................. 370/254, 370/258, 238; 709/201, 217; 703/13
See application file for complete search history.

(56) References Cited

U.S. PATENT DOCUMENTS

| | | | |
|---|---|---|---|
| 5,920,727 A | 7/1999 | Kikinis et al. | |
| 7,613,135 B2 * | 11/2009 | Li et al. | 370/258 |
| 7,733,117 B1 | 6/2010 | Priel et al. | |
| 7,752,024 B2 * | 7/2010 | Ball et al. | 703/13 |
| 7,756,042 B2 * | 7/2010 | Guo et al. | 370/238 |
| 2002/0083284 A1 | 6/2002 | Matsubara et al. | |
| 2004/0128528 A1 | 7/2004 | Poisner | |
| 2004/0225439 A1 | 11/2004 | Gronemeyer | |
| 2005/0047353 A1 | 3/2005 | Hares | |
| 2005/0265239 A1 | 12/2005 | Previdi et al. | |
| 2006/0007616 A1 | 1/2006 | Pan et al. | |
| 2006/0173855 A1 | 8/2006 | Turner et al. | |
| 2007/0064702 A1 | 3/2007 | Bastes et al. | |
| 2007/0237081 A1 | 10/2007 | Kodialam et al. | |
| 2007/0237097 A1 | 10/2007 | Maharana et al. | |
| 2007/0268059 A1 | 11/2007 | Sakaguchi et al. | |
| 2008/0256175 A1 | 10/2008 | Lee et al. | |
| 2009/0240758 A1 * | 9/2009 | Pasko et al. | 709/201 |
| 2010/0125643 A1 * | 5/2010 | Gerber et al. | 709/217 |

(Continued)

FOREIGN PATENT DOCUMENTS

CN    102057637 A    5/2011

(Continued)

OTHER PUBLICATIONS

PCT Notification of Transmittal (1 page) of the International Search Report (3 pages) and the Written Opinion of the International Searching Authority, or the Declaration (4 pages) mailed Aug. 19, 2010 for PCT/US2010/037135.

(Continued)

*Primary Examiner* — Kwang B Yao
*Assistant Examiner* — Syed M Bokhari
(74) *Attorney, Agent, or Firm* — Patent Capital Group

(57) ABSTRACT

A node in an overlay network requests a ranked list of other nodes in multiple areas of the overlay network that can provide a desired piece of content or service to the requesting node. A separate node such as a router generates the ranked list using a routing algorithm, returning the list to the requesting node so that the requesting node may acquire the desired content or service from the nearest node in the overlay network.

20 Claims, 3 Drawing Sheets

U.S. PATENT DOCUMENTS

2010/0128638 A1* 5/2010 Navas et al. .................. 370/254
2010/0202448 A1 8/2010 Previdi et al.
2011/0258257 A1 10/2011 Previdi

FOREIGN PATENT DOCUMENTS

| EP | 0 150 480 B1 | | 12/1984 |
|---|---|---|---|
| WO | PCT/US2010/037135 | | 6/2010 |
| WO | WO 2010/144291 | A1 | 12/2010 |
| WO | WO 2011/133203 | | 10/2011 |

OTHER PUBLICATIONS

Akonjang, O. et al., "The PROXIDOR Service," IETF Draft, Mar. 2, 2009 XP015060381; 17 pgs.; http://tools.ietf.org/pdf/draft-akonjang-alto-proxidor-00.pdf.

U.S. Appl. No. 12/368,436, filed Feb. 10, 2009.

USPTO Dec. 14, 2010 Response to Sep. 15, 2010 Nonfinal Office Action from U.S. Appl. No. 12/368,436.

USPTO Sep. 15, 2010 Nonfinal Office Action from U.S. Appl. No. 12/368,436.

USPTO Jan. 13, 2011 Final Office Action from U.S. Appl. No. 12/368,436.

USPTO Apr. 13, 2011 RCE Response to Jan. 13, 2011 Final Office Action from U.S. Appl. No. 12/368,436.

USPTO May 27, 2011 Notice of Allowance from U.S. Appl. No. 12/368,436.

Pending, U.S. Appl. No. 11/942,799, filed Nov. 30, 2007, Previdi et al.

Vinay Aggarwal, Anja Feldmann, Christian Scheideler; "Can ISPs and P2P Users Cooperate for Improved Performance?" ACM SIGCOMM Computer Communication Review, vol. 37, No. 3, Jule 2007.

Ruchir Bindal, Pei Cao, and William Chan, Jan Medved, George Suwala, Tony Bastes, Amy Zhang; "Improving Traffic Locality in BitTorrent via Biased Neighbor Selection", Jul. 24, 2006.

U.S. Appl. No. 13/109,461 filed May 17, 2011 entitled "Method and Apparatus for Routing Requests for Service Using BGP Community Attributes," Inventor(s): Manish Bhardwaj, et al.

Li, T., et al., "Domain-Wide Prefix Distribution with Two-Level IS-IS," Network Working Group RFC 2966, Oct. 2000, 16 pages http://www.ietf.org/rfc/rfc2966.txt.

PCT Dec. 22, 2011 International Preliminary Report on Patentability and the Written Opinion of the International Search Authority from PCT/US2010/037135.

PCT Sep. 12, 2011 International Search Report from PCT-US2011-000622; 1 page.

Penno, R., et al., "ALTO Protocol-draft-penno-alto-protocol-03.txt," Internet Draft, Internet Engineering Task Force, Jul. 13, 2009; 45 pages; http://tools.ietf.org/pdf/draftpenno-alto-protocol-03.pdf.

\* cited by examiner

ROUTING-BASED PROXIMITY FOR COMMUNICATION NETWORKS

I. FIELD OF THE INVENTION

The present application relates generally to determining proximity in communication networks, including but not limited to peer-to-peer networks and other forms of overlay networks.

II. BACKGROUND OF THE INVENTION

A peer-to-peer network is an example of a network (of a limited number of peer devices) that is overlaid on another network, in this case, the Internet. In such networks it is often the case that a piece of content or a service desired by one of the peers can be provided by more than one other node in the overlay network, and it is desirable to select the source node to optimize efficiency.

BRIEF DESCRIPTION OF THE DRAWINGS

The details of the present disclosure, both as to its structure and operation, can best be understood in reference to the accompanying drawings, in which like reference numerals refer to like parts, and in which.

DESCRIPTION OF EXAMPLE EMBODIMENTS

Overview

An apparatus includes a processor and a computer readable storage medium bearing instructions to cause the processor to receive node identifications from a requesting node. The node identifications are associated with respective peers to the requesting node in an overlay network that uses infrastructure of a backbone network. The requesting node resides in a different area than at least some of the peers. The processor uses a shortest path first (SPF) algorithm to determine a respective metric associated with each peer and the requesting node. Based on the metric, a list of peers is generated and returned to the requesting node.

In example non-limiting embodiments, the apparatus can be a service gateway (SG). The processor may install SGs in each area and establish tunnel-based adjacencies among SGs and identify each SG as a member of a given area. Link-state databases may be flooded from the SGs to reflector SGs, where they are stored.

The apparatus may employ an open shortest path firs routing protocol or may employ an intermediate system to intermediate system (ISIS) routing protocol.

In another embodiment, a tangible computer readable medium bears instructions executable by a computer processor for receiving from a requesting node in a communication network a list of other nodes in a plurality of areas in the network that can provide a desired piece of content or service to the requesting node. The instructions cause the processor to generate a ranked list of the other nodes and return the ranked list to the requesting node.

In another embodiment, a computer-implemented method includes receiving a list of at least two nodes residing in a plurality of areas from a requesting node, executing a shortest path first (SPF) algorithm on each of the at least two nodes relative to the requesting node to generate an ordered list of the at least two nodes, and returning the ordered list to the requesting node.

Example Embodiments

Figure 1:
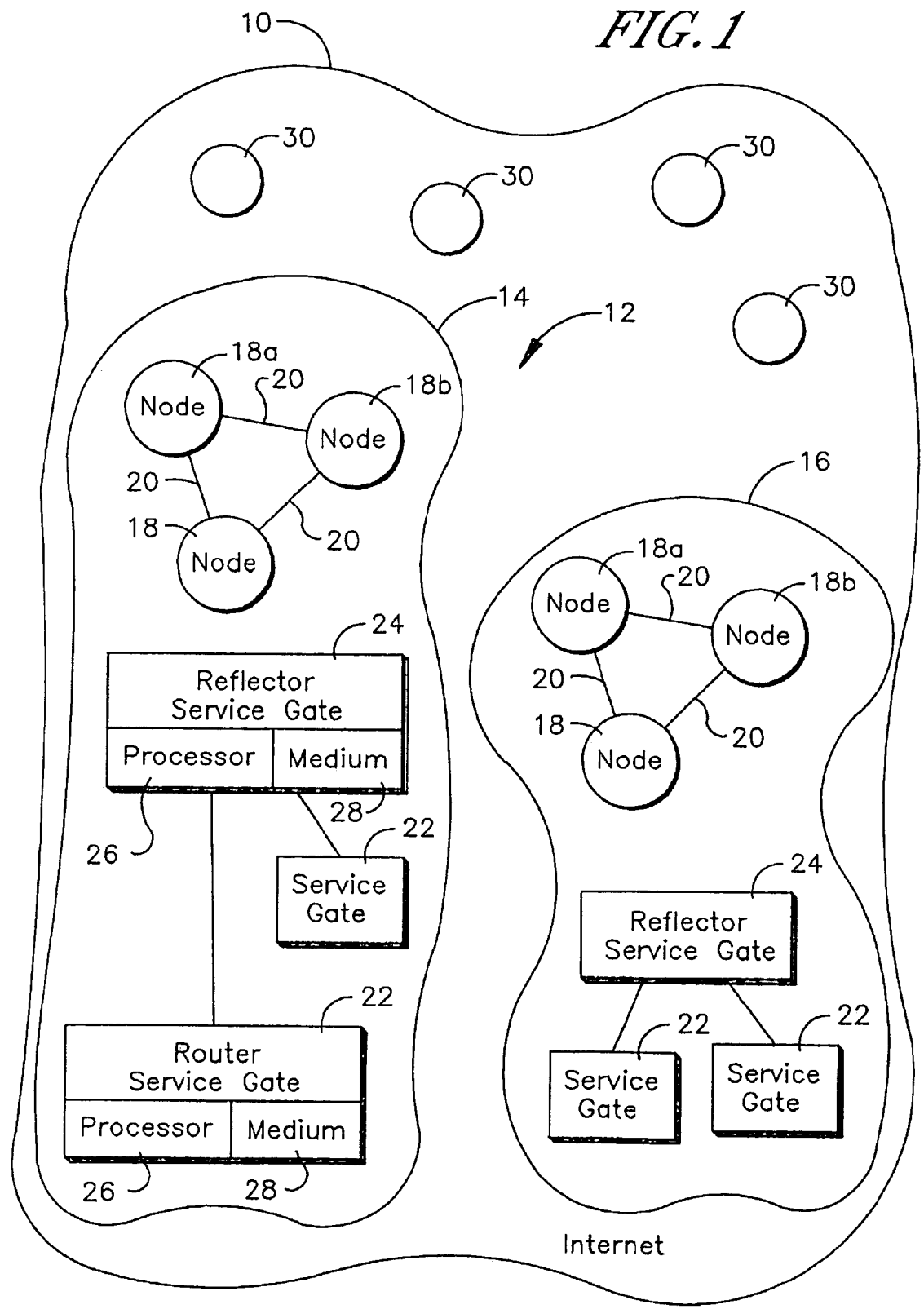
FIG. 1 is a block diagram of an example system in accordance with present principles.

Referring initially to FIG. 1, a backbone network 10, such as the Internet, includes an overlay network 12, which includes plural areas 14, 16. For simplicity, only two areas are shown in the overlay network 12. The overlay network 12, being overlaid on the backbone network 10 uses the infrastructure of the backbone network 10. Each area 14, 16 includes a plurality of nodes 18 (for simplicity, only three nodes are shown in each area).

In the embodiment shown the overlay network 12 may be a peer-peer network in which content is moved along overlay network links 20 among consumer end points such as personal digital assistants (PDAs), etc., it being understood that present principles are not necessarily limited to peer-to-peer networks. For example, present principles may apply to a service provider operated overlay network such as a network of service nodes or a service provider operated content delivery network (CDN). Further, in some embodiments an overlay network is not necessarily implicated when, for instance a proximity-sorted list of nodes is to be generated by one node on behalf of another node so that the other node can know the nearest instance of a network service, such as a cache or voice-over-Internet gateway for example.

The backbone network 10 may include service gateways (SOs) including regular service gateways 22 and reflector service gateways 24. The SGs 22, 24 may be part of the overlay network 12. In one embodiment the SGs 22, 24 may be implemented by a router or switch or server or other node type.

Typically, a SG includes one or more processors 26 accessing one or more computer readable storage media 28 such as solid state storage, disk storage, etc. A program, referred to herein as a proximity function, may embody portions of present logic and may be stored on the media 28 for execution thereof by the processor 26. Other parts of the logic may be implemented by one or more nodes 18 of the overlay network 14. Also, other nodes 30 including end user client devices, Internet servers, routers, switches, etc. typically are part of the backbone network 14.

Figure 2:
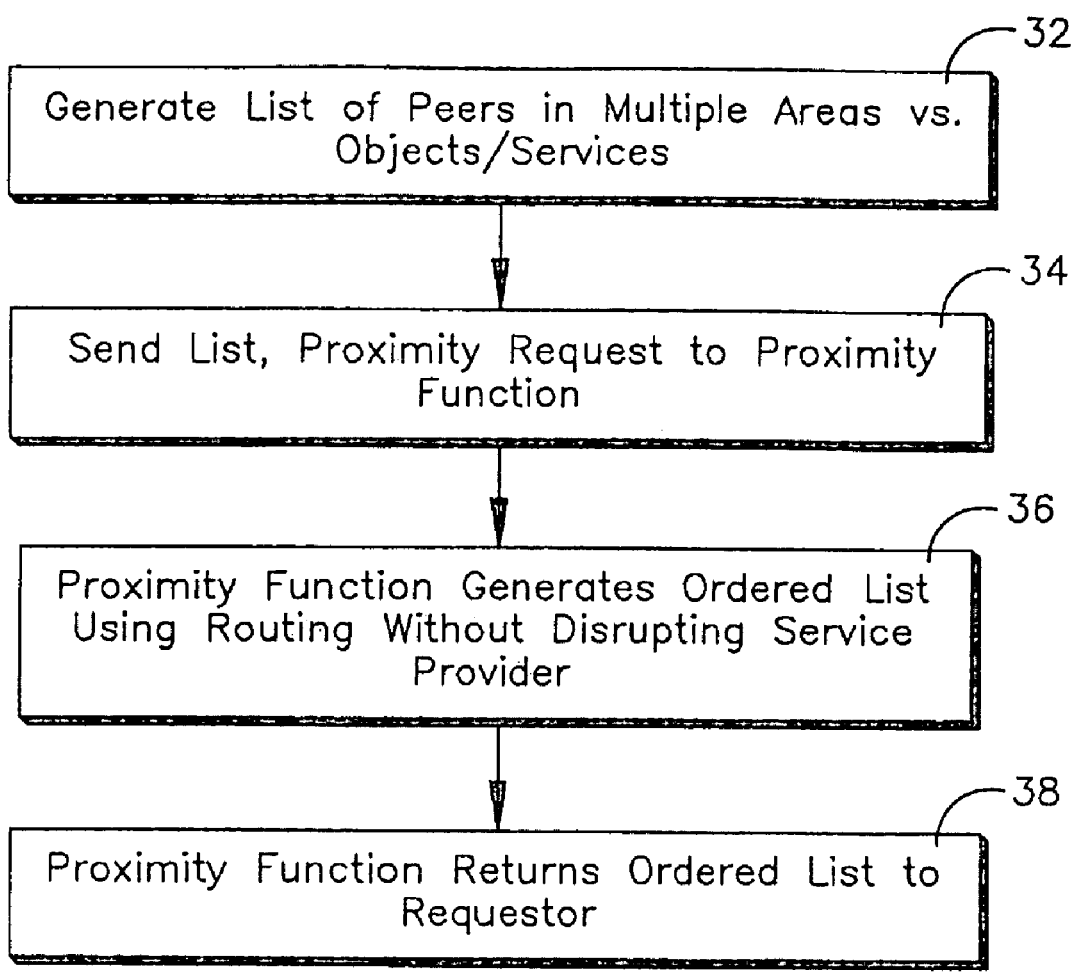
FIG. 2 is a flow chart of general example logic.

FIG. 2 shows overall example logic in accordance with present principles. In describing FIGS. 2 and 3 the following terms may be used:

Autonomous System is a set of routers and links under a common administration, typically a service provider network (or a regional part of one) or an enterprise network. An Autonomous System, in addition to being directed to organizing a network, also has implications in the way BGP protocol (defined below) is deployed.

Interior Gateway Protocol (IGP) is a routing protocol deployed inside an Autonomous System and used to create routing schemes including nodes (routers) and links that form the network topology through which IP packets are routed/forwarded. Example IGPs include Open Shortest Path First (OSPF, a link state routing protocol), Intermediate System to Intermediate System (ISIS, another link state routing protocol), Enhanced Interior Gateway Routing Protocol (EIGRP), and Routing Information Protocol (RIP).

Link-state protocols are routing protocols based on link-state advertisement, of which ISIS and OSPF are examples. Characteristics of link-state protocols include the advertising by each node of its local connectivity to the rest of the other nodes. This is in contrast to distance-vector protocols, wherein each node advertises the content of its routing information base to its adjacent neighbors.

An "area" is a group of contiguous networks and attached hosts that is specified to be an area by a network administrator or manager. A domain is a collection of connected areas. Routing domains provide full connectivity to all end systems within them. "Levels" are defined with respect to areas. For example, Level 1 routing is routing within a single Level 1 area, while Level 2 routing is routing between two (or more) different Level 1 areas.

Border Gateway Protocol (BGP) is a protocol for communicating between an autonomous system and other routers in the underlying network, e.g., to connect one autonomous system to another. BGP's uses include advertising reachability information across Autonomous System boundaries and to propagate reachability information (for instance, as received from an external Autonomous System) into a local Autonomous System.

Shortest Path First (SPF) and Reverse Shortest Path First (R-SPF) are algorithms that can be executed by each router in a link-state network, for instance, by each router that executes either ISIS or OSPF. The purpose of SPF is to build a routing information base (RIB) that is used by the router to route/forward IP packets. The algorithm can use data structure and logic, including, among data structures, three lists. An "UNKNOWN" list contains all nodes known in the topology (the network) for which no path has been computed yet. A TENTative list contains nodes for which at least one path has been computed (but may not be the shortest one). A PATHS list contains a list of nodes for which shortest path to it has been computed. An SPF or R-SPF algorithm runs by moving nodes from one list to another in the order: UNKNOWN→TENT→PATHS, and stops when the TENT list is emptied. An example SPF algorithm is the Dijkstra Algorithm. The difference between SPF and R-SPF is in the way nodes are inspected and evaluated during the algorithm. The forward SPF algorithm computes the shortest path based on the cost from a reference node to each other node in the network while the R-SPF (reverse) takes into account the reverse metric, i.e., the metric from each node in the network to the reference node.

Area border router (ABR) node is a node that has connections to nodes in more than one area.

Referring again to FIG. 1, an SG 22 implements routing protocols (ISIS, OSPF and BOP) and a set of proximity algorithms, and exposes an Application Programming Interface (APT), such as a Web service. An SG 22 receives proximity requests from clients and replies to these requests with proximity responses. A proximity request contains a Proximity Source Address (PSA), or reference address, and a list of IP addresses, referred to as Proximity Target Addresses (PTAs). The PTAs represents the candidate list, which is referred to as the Proximity Target List (PTL).

The proximity function returns a ranked list of IP addresses. The ranking is based on topological (metric) distance from the given reference address. For example, a client of a content exchange application, with an IP address 192.168.199.11, has the choice of downloading a given content from IP addresses: 192.168.10.1, 192.168.33.22 and 192.168.54.2. The client node 18a sends a request to the SG 22. The proximity request has the following form:
Proximity Source Address (PSA): 192.168.199.11
Proximity Target Address (PTA): 192.168.10.1
Proximity Target Address (PTA): 192.168.33.22
Proximity Target Address (PTA): 192.168.54.2
The client node 18a builds the Proximity Request with PSA and PTL fields and sends it to the SG 22. The SG 22 will reply with an ordered list of IP addresses, which will be the PTAs ranked in order of their proximity to the PSA.

In FIG. 2, at block 32, a node 18a (referred to herein as a "requesting node") in the overlay network 10 that wishes to obtain objects/services from another node 18b in the network 12 generates a list of overlay network nodes 18b (also referred to as "peers") reflecting objects and/or services that are available at each node 18b. The overlay network nodes 18b may be in the same area 14 as the requesting node 18a, or may be in another area, such as area 16. The list is sent at block 34 to the SG 22 executing the proximity function along with a request to re-order the list according to the proximity of the peer nodes 18b to the requesting node 18a (which is the reference node in the subsequent SPF calculations).

The SG 22 executes the proximity function at block 36 to generate a list ordered by proximity to the requesting node of the peer nodes 18b, preferably without disrupting the service provider of the overlay network 12. To this end, the SG 22 may be programmed to never originate any routing update pursuant to its cooperation with the overlay network 12 in the form of, e.g. ISIS or OSPF or BGP packets. Also, the SG may be programmed to never attract traffic pursuant to its cooperation with the overlay network 12 by, for example, setting appropriate values for ISIS overload bits and/or for OSPF "maxage" metrics.

With more specificity, in example non-limiting embodiments the SG 22 acquires routing information from routing protocols such as OSPF/ISIS/BGP. To do this, the SG 22 participates in the routing scheme in the sense that it establishes adjacencies/sessions with routers and collects a routing database as part of the normal routing protocol operations. However, in example embodiments the SG does not fully become part of the routing scheme in the sense that the SG 22 does not become a "router" in terms of routing/forwarding traffic unrelated to the present discussion. Accordingly, in example embodiments the SG 22 diverts incoming traffic using the overload bit (in the case of ISIS), or the "max metric" (in the case of OSPF/ISIS) such that apart from its operation discussed herein the SG 22 is transparent to the network. Thus, in example embodiments the SG 22 does not receive any traffic that would require a routing/forwarding operation; however, in example embodiment the SG 18 receives traffic if and only if such traffic is destined to the SG 22 itself.

Returning to FIG. 2, the proximity function causes the SG 22 to return the ordered list to the requesting node at block 38. Details on how a SG initializes and executes the proximity function are set forth in co-pending U.S. patent application Ser. No. 12/368,436, incorporated herein by reference. For convenience, relevant details from the referenced patent application are set forth as follows.

All nodes that "advertise" the requesting node are moved into a TENT list of the SG. By "advertise" is meant indicate a peer relationship with the requesting node. The "advertising nodes" typically are the nodes compiled by the requesting node and sent to the SG as part of the request to reorder the nodes by proximity. In this way, the SG is better permitted to process multi-homed prefixes. Pseudonodes in the TENT list may be given higher preference than non-pseudonodes. A pseudonode may be established by a local area network (LAN) or other entity that might be represented as a single node. By "preference" is meant that when a node is to be moved into the PATHS list from the TENT list and a non pseudonode and a pseudonode both have the same cost (root distance), the pseudonode is preferred.

As explained in the referenced patent application, for all TENT nodes sharing a common prefix with the requesting node (i.e., is co-located with the requesting node), the proximity of such nodes is set to zero. That is, when the requesting node shares the same subnet with one or more nodes under test (and thus are "co-located"), the co-located node or nodes under test are preferred.

A SPF cycle is started for each node in the TENT list, wherein as each TENT node is moved into the PATHS list of the SG the prefixes advertised by the node being moved are inspected. If all prefixes for which proximity is to be evaluated are processed (i.e., all prefixes to be evaluated are known into the PATHS list), then the proximity algorithm can stop because proximity has been computed for all requested prefixes.

A SPF metric is computed for each node in the PATHS list relative to the requesting node. An SPF metric represents proximity between the requesting node and another node. When a requesting node requests an object or service a reverse-SPF calculation may be used, i.e., an SPF calculation may be made from the PATHS node under test to the requesting node. In the event that the requesting node is requesting to upload an object or service to another node in the overlay network, a forward-SPF calculation used, i.e., from the requesting node to the PATHS node under test.

Once proximity metrics have been calculated for all nodes in the PATHS list, a ranked list of nodes is generated by proximity, e.g., from closest proximity to farthest from the requesting node. The list is returned to the requesting node, which can consult the list to obtain the desired object/service, typically by communicating with the node at the "closest" end of the list.

Figure 3:
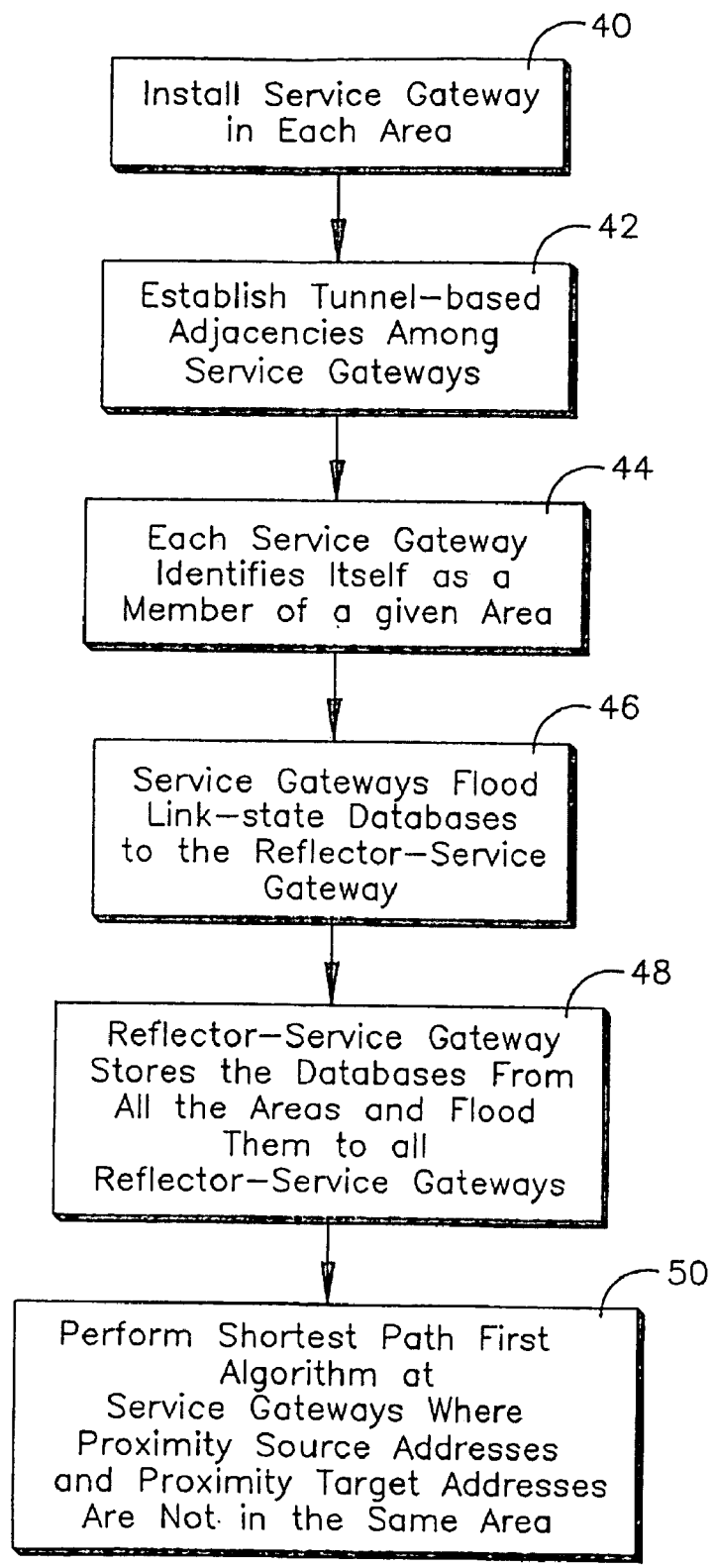
FIG. 3 is a flow chart of more detailed example logic.

FIG. 3 shows the generation of the ordered list in situations where the peer nodes exist in multiple areas 14, 16 in example embodiments. For example, FIG. 3 shows one way in which steps 34 and 36 in FIG. 2 may be performed. The SG 22 leverages the link-state database in order to compute proximity between two or more addresses. Example embodiments allow the determination of routing metric distance between two or more IP hosts within an OSPF/ISIS topology deploying multiple areas, or levels. The logic commences at block 40 in FIG. 3 with an SG 22 assumed as being installed in each area including the area of the backbone network 10. At block 42 tunnel-based adjacencies ("TA") are established among SGs 22 using, e.g., generic routing encapsulation. Each SG does not advertise its set of tunnel adjacencies in its own area, but instead floods to its TA neighbors link state area/link state protocol (LSA/LSP) information received through a non-TA neighbor.

One or more SGs, referred to as "reflector SGs" 24 may function as IGP Route Reflectors using, e.g., BGP route reflection principles with the exception that the requesting node does not offer a selection of prefix preference. The reflector SGs 24 receive link-state databases from their peer SGs and pass those databases on to other SG peers. In such example embodiments, each SG 22 has a TA with one and only one reflector SG 24 for efficiency, and a reflector SG 24 implements logic in which LSA/LSP information received by a non-TA neighbor is sent to all TA neighbors and non-TA neighbors, with information received by a TA neighbor being sent only to all other TA neighbors.

With the above information exchange and scope of TAs between SGs residing in different areas, a SG can correlate with each other the various link state databases it receives. With more specificity, when a ABR/L1L2 router (a router that interfaces between two different levels) is reached, the corresponding link state database (LSDB) is inspected by the SG and proximity computation continues by exploring this other area/level. This requires an identification or association information between the ABR and its area to be communicated as mentioned above, which information is available through the above-described SG TAs. As an example, an SG 22 can compute proximity to find the shortest path to an ABR, which can have different IDs in different areas/levels. With this information, the SG 22 determines which other areas also have the same ABR present as indicated by the ABR IDs associated with that other area, with the SG then continuing the proximity calculations for nodes in such other area.

Note that a SG need not recompute proximity because of a convergence change (i.e., a convergence change in an IGP area need not trigger proximity recomputation).

As mentioned above, in some example embodiments each SG 22 has a session/adjacency with a single reflector SG 24. As also described above and referring back to FIG. 3, at block 44 each SG 22 identifies itself as a member of a given area ID (given by either OSPF or ISIS area address/number) and exchanges this identification information with other SGs when establishing a TA relationship.

Reflecting the description above in FIG. 3, each SG 22 also floods its link-state database to the reflector SG 24 at block 46. In flooding, a source node sends a message to all other nodes in the network. The reflector SG 24 stores the databases from all areas and floods them to all reflector-client SGs in block 48. This may be done according to a basic split-horizon rule: do not reflect a given area database back to an SG 22 that is a member of the same area.

When reflection work is completed, each SG 22 has received all link-state area databases. This will enable at block 50, SPF (or reverse SPF) calculations at an SG 22 to proceed in accordance with the description above even if the Proximity Source Address (PSA) and one or more Proximity Target Addresses (PTAS) are not in the same area.

The performance of the SPF/R-SPF algorithms may be performed differently depending on whether OSPF or ISIS routing protocols are applied. In the case of OSPF during SPF/R-SPF calculations, when the calculation reaches an ABR, the databases for both Area 0 (its own area) and the other areas in which ABR participates are inspected. These multiple topologies can be attached to form a single tree and the computation may proceed much as in the case of a single tree.

In the case of ISIS, during SPF/R-SPF calculations, when the calculation reaches a L1L2 router, the level-2 database and the level-1 database(s) in which the router participates are inspected. The level-1 database(s) and the level-2 database can be attached together in order to form a single tree, and the computation proceeds as described above.

While the particular ROUTING-BASED PROXIMITY FOR COMMUNICATION NETWORKS is herein shown and described in detail, it is to be understood that the subject matter which is encompassed by the present disclosure is limited only by the claims.

What is claimed is:

1. A system comprising: at least one non-transitory computer readable storage medium storing data; at least one processor configured to perform operations on the stored data; a service gateway configured to: receive node identifications of a plurality of nodes from a requesting node, the plurality of nodes being peers to the requesting node in an overlay network using infrastructure of a backbone network, the requesting node residing in a different specified network area than at least some of the plurality of nodes including a second node residing in a second network; determine a topological distance between the requesting node and each of the plurality of nodes, wherein a shortest path first (SPF) proximity algorithm is used to determine the topological distance between the requesting node and at least one of the plurality of nodes and determining the topological distance between the requesting node and the second node includes using link state information of a second service gateway associated with the second area and received from the second service gateway over a tunnel-based adjacency established between the service gateway and the second service gateway; generate a list of peers ranking the plurality of nodes, based at least in part on the respective topological distance of each node in the plurality of nodes to the requesting node; and return the list of peers to the requesting node in response to a proximity request received from the requesting node, the proximity request including the node identifications.

2. The system of claim 1, wherein the service gateway is a first service gateway associated with a first area and determining distance between the requesting node and the second node includes:
 establishing the tunnel-based adjacency between the service gateway and the second service gateway associated with the second area, wherein the service gateway and second service gateway are including in a plurality of service gateways each associated with at least one network area in a plurality of network areas;
 identifying the second service gateway as a member of the second area; and
 receiving link state databases of other service gateways in the plurality of service gateways, including the link state database of the second service gateway, wherein the link state database of each service gateway is flooded to at least some of the service gateways in the plurality of service gateways.

3. The system of claim 1, wherein the proximity request includes a proximity source address corresponding to the requesting node, the service gateway further configured to identify that the proximity source address is in a different area than at least one of the plurality of nodes identified in the received node identifications.

4. The system of claim 1, wherein an Open Shortest Path First (OSPF) routing protocol is employed.

5. The system of claim 4, wherein during the use of the SPF algorithm, multiple topologies from multiple areas are attached to form a single tree.

6. The system of claim 2, further comprising a reflector service gateway associated with the first service gateway, the reflector service gateway storing link state information from other areas in the plurality of areas from the link state databases received by the first service gateway, the reflector service gateway configured to:
 receive requests from the first service gateway relating to a proximity determination relating to a particular node, in the plurality of nodes, from a different area; and
 return, to the first service gateway, link state information corresponding to the different area in response to the received requests from the first service gateway.

7. The system of claim 1, wherein the service gateway is transparent to the overlay network.

8. The system of claim 7, wherein the service gateway collects link state data in connection with routing protocol operations and receives traffic only if the traffic is destined for the service gateway.

9. An article comprising logic encoded in non-transitory media and operable, when executed by a processor, to perform operations comprising:
 receiving from a requesting node in a communication network a proximity request including a list of a plurality of other nodes in a plurality of areas in the network that can provide a desired piece of content to the requesting node, the plurality of the other nodes including a particular node residing in a particular network area different from the area of the requesting node;
 determining a topological distance between the requesting node and each of the plurality of other nodes, wherein determining topological distance between the requesting node and the particular node includes using link state information of a service gateway associated with the particular area and received from the service gateway over a tunnel-based adjacency established with the service gateway;
 generating a ranked list of the plurality of other nodes ranking the plurality of other nodes, based at least in part on the respective topological distance of each of the plurality of other nodes to the requesting node; and
 returning the ranked list to the requesting node in response to the proximity request.

10. The article of claim 9 wherein the operations further comprising:
 establishing tunnel-based adjacencies among a plurality of service gateways each associated with at least one network area in the plurality of areas;
 identifying each service gateway as a member of the respective area associated with the service gateway;
 participating in flooding link state databases among the plurality of service gateways to correlate link state information among at least a portion of the plurality of areas, each service gateway in the plurality of service gateways having a respective link state database; and
 storing flooded link state databases of service gateways associated with the portion of the plurality of areas for use in determining topological distance between nodes in different areas.

11. The article of claim 9, wherein topological distance is determined at least in part using a shortest path first (SPF) proximity algorithm.

12. The article of claim 9, wherein each of the requesting node and the plurality of other nodes are peer nodes in a peer-to-peer network.

13. The article of claim 9, wherein each area in the plurality of areas is a defined grouping of contiguous networks and attached nodes.

14. A computer-implemented method comprising:
 receiving, using at least one processing device, a proximity request from a requesting node, the proximity request including a list of at least two nodes, identified by the requesting node, at least one particular node of the at least two nodes residing in a particular area different from the requesting node;
 determining, using at least one processing device, a topological distance between the requesting node and each of the at least two nodes by executing a shortest path first (SPF) algorithm on each of the at least two nodes relative to the requesting node, wherein determining topological distance between the requesting node and the particular node includes using link state information of a service gateway associated with the particular area and received from the service gateway over a tunnel-based adjacency established with the service gateway;
 generating, using at least one processing device, an ordered list of the at least two nodes ranking the at least two nodes, based at least in part on the respective topological distance of each of the at least two nodes to the requesting node; and
 returning, using at least one processing device, the ordered list to the requesting node in response to the proximity request.

15. The method of claim 14, further comprising:

identifying that the requesting node is in a first area in a plurality of network areas and that the particular node is in a second area in the plurality of network areas;

retrieving link state data for the second area captured during a flooding of link state databases from a plurality of service gateways including a particular service gateway associated with the second area, the respective link state database of the particular service gateway including link state data for the second area; and storing databases from each area in the reflector-using the retrieved link state data for the second area to determine the distance between the requesting node and the particular node.

16. The method of claim 14, wherein an Open Shortest Path First (OSPF) routing protocol is employed.

17. The method of claim 16, wherein during use of the SPF algorithm, multiple topologies from multiple areas are attached to form a single tree.

18. The method of claim 14, wherein an Intermediate System to Intermediate System (ISIS) routing protocol is employed.

19. The method of claim 18 further comprising attaching a level 1 database and a level 2 database to form a single tree.

20. The method of claim 14, further comprising:

receiving a second proximity request from a second requesting node on behalf of another node, the second proximity request including a listing of the other node and a plurality of peer nodes to the other node;

determining a topological distance between the other node and each of the plurality of peer nodes by executing a shortest path first (SPF) algorithm on each of the plurality of peer nodes relative to the other node;

generating an ordered list of the plurality of peer nodes ranking the plurality of peer nodes, based at least in part on the respective topological distance of each of the plurality of peer nodes to the other node; and returning the ordered list to the second requesting node in response to the second proximity request.

* * * * *